(12) United States Patent
Breu

(10) Patent No.: US 8,113,083 B2
(45) Date of Patent: Feb. 14, 2012

(54) DEVICE FOR DISPLACING AND POSITIONING AN OBJECT IN SPACE

(75) Inventor: Michael Breu, Luechingen (CH)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 12/524,626

(22) PCT Filed: Dec. 28, 2007

(86) PCT No.: PCT/EP2007/064618
§ 371 (c)(1),
(2), (4) Date: Jul. 27, 2009

(87) PCT Pub. No.: WO2008/092540
PCT Pub. Date: Aug. 7, 2008

(65) Prior Publication Data
US 2010/0005919 A1   Jan. 14, 2010

(30) Foreign Application Priority Data
Jan. 29, 2007 (DE) .......................... 10 2007 004 379

(51) Int. Cl.
*B25J 18/00* (2006.01)
(52) U.S. Cl. ..................... 74/490.01; 74/490.03; 901/16; 901/27
(58) Field of Classification Search ............... 74/490.01, 74/490.03, 490.05; 901/14–18, 27–28
See application file for complete search history.

(56) References Cited

U.S. PATENT DOCUMENTS

| 5,333,514 | A * | 8/1994 | Toyama et al. ............. 74/490.06 |
| 6,419,211 | B1 * | 7/2002 | Hvittfeldt et al. ............... 267/69 |
| 6,516,681 | B1 | 2/2003 | Pierrot et al. |
| 6,766,711 | B2 * | 7/2004 | Hvittfeldt et al. .......... 74/490.05 |
| 6,896,473 | B2 * | 5/2005 | Schuler .......................... 414/729 |

(Continued)

FOREIGN PATENT DOCUMENTS

DE   102008062958 A1 *  7/2010

(Continued)

*Primary Examiner* — Richard W Ridley
*Assistant Examiner* — Matthew R Vaerewyck
(74) *Attorney, Agent, or Firm* — Ronald E. Greigg

(57) ABSTRACT

The invention relates to a device for displacing and positioning an object in a space, having at least three actuating arms that can pivot about a transmission axis. Each arm is connected to a motor unit/transmission unit. A carrier element is provided in order to arrange at least one gripping element for gripping the object. Each actuating arm, on the free ends thereof, has a first articulated axis that is parallel to the transmission axis with first articulated parts arranged at a distance from each other, of a first ball joint. The carrier element has a second articulated axis associated with each actuating arm with first articulated parts that are arranged at a distance in relation to each other, of a second ball joint. The first articulated axis is connected to the second articulated axis by a pair of connecting bars which include terminal second articulated parts. The terminal second articulated parts of the connecting bars form the first and second ball joints with the first articulated parts on the first articulated axis and the first articulated parts on the second articulated axis. The connecting bars for stabilizing the ball joints are connected together. According to the invention, the connecting bars are made of an essentially elastic material and are connected together by at least one prestressing element made of an essentially stiff material.

13 Claims, 2 Drawing Sheets

U.S. PATENT DOCUMENTS

| | | | |
|---|---|---|---|
| 7,188,544 B2* | 3/2007 | Persson et al. | 74/490.03 |
| 7,331,253 B2* | 2/2008 | Burkert et al. | 74/490.01 |
| 7,395,136 B2* | 7/2008 | Osten | 700/258 |
| D619,632 S * | 7/2010 | Feng | D15/199 |
| 2003/0064816 A1* | 4/2003 | Schuler | 464/102 |
| 2003/0121350 A1* | 7/2003 | Hvittfeldt et al. | 74/490.01 |
| 2004/0103741 A1* | 6/2004 | Burkert et al. | 74/490.01 |
| 2004/0143876 A1* | 7/2004 | Persson et al. | 901/1 |
| 2005/0177279 A1* | 8/2005 | Osten | 700/258 |
| 2006/0182602 A1* | 8/2006 | Schuler et al. | 414/735 |
| 2007/0137374 A1* | 6/2007 | Schuler et al. | 74/490.06 |
| 2008/0141813 A1* | 6/2008 | Ehrat | 74/490.01 |
| 2010/0005919 A1* | 1/2010 | Breu | 74/490.05 |
| 2011/0033275 A1* | 2/2011 | Lehmann | 414/737 |
| 2011/0100145 A1* | 5/2011 | Feng | 74/490.01 |
| 2011/0100180 A1* | 5/2011 | Mulders et al. | 83/401 |

FOREIGN PATENT DOCUMENTS

| | | |
|---|---|---|
| FR | 2690372 A1 | 10/1993 |
| WO | 03106114 A1 | 12/2003 |
| WO | WO 2010069298 A1 * | 6/2010 |

* cited by examiner

DEVICE FOR DISPLACING AND POSITIONING AN OBJECT IN SPACE

CROSS-REFERENCE TO RELATED APPLICATION

This application is a 35 USC 371 application of PCT/EP2007/064618 filed on Dec. 28, 2007.

BACKGROUND OF THE INVENTION

1. Field of the Invention

The invention relates to a device for moving and positioning an object in space, having at least three actuating arms that are each connected to a motor/transmission unit and are pivotable around a transmission axis, a support element provided for arranging at least one gripping mechanism for gripping the object; at its free end, each actuating arm has a first articulation axis extending parallel to the transmission axis, with first joint parts spaced apart from each other, each belonging to a respective first ball joint; the support element has a second articulation axis associated with each actuating arm, with first joint parts spaced apart from each other, each belonging to a respective second ball joint; the first articulation axis is connected to the second articulation axis by means of a pair of connecting rods that have second joint parts at the ends and, together with the first joint parts on the first articulation axis and the first joint parts on the second articulation axis, these second joint parts at the ends of the connecting rods form the first and second ball joints; and the connecting rods are connected to each other in order to stabilize the ball joints. The device for moving and positioning an object in space is a device referred to in professional circles as a robot with parallel kinematics.

2. Description of the Prior Art

A device with three parallelogram rod assemblies of the type mentioned at the beginning, which is also referred to as a "delta robot," is known from WO-A-03/106114. The two connecting rods composed of a stiff material and belonging to a parallelogram have pairs of pins that protrude laterally in the region of the ball joints. Pairs of O-rings composed of a rubber-elastic material are elastically stretched into place around the pins on opposite sides of the connecting rods. The prestressing force produced between the two connecting rods holds the sockets against the balls. The prestressing also provides the required restoring moment that prevents the rods from twisting due to friction, dynamic forces, and forces exerted by components mounted on the rods such as vacuum hoses. In lieu of rubber-elastic O-rings, U.S. Pat. No. 6,419,211 has disclosed non-paired spring elements that have two angled elements with a compression spring situated between them.

In the event of an overload, i.e. when the loads on the joints become greater than the prestressing forces, the joints decouple, which is a desired safety function and prevents the destruction of the robot.

The elastomer elements currently used to produce a prestressing between the connecting rods are encumbered by the following disadvantages:

Material-related aging and fatigue phenomena: creeping, flowing, relaxation.

Application-related aging and fatigue phenomena due to: cleaning agents, UV, stresses extending into the plastic strength range, low environmental temperatures (brittleness).

Limited dimensional accuracy of the prestressing due to material tolerances.

Primary function not dimensioned for the absorption of required restoring moments for lateral hose routing on the connecting rods.

With gradual destruction of the prestressing element, it is not possible to assure detectability of falling components in products to be processed.

Limited possibility of predicting the service life due to the above-mentioned conditions.

Hygiene requirements make it impossible to use conventional spring elements such as steel springs.

U.S. Pat. No. 6,516,681 has disclosed a robot with parallel kinematics that has four parallelogram rod assemblies.

OBJECT AND ADVANTAGES OF THE INVENTION

The object of the invention is to avoid the disadvantages that occur in a device of the type mentioned at the beginning, which is equipped with prestressing elements known from the prior art.

This object is attained according to the present invention in that the connecting rods, which are composed of an essentially elastic material, are connected to each other by means of at least one prestressing element composed of an essentially rigid material.

Preferably, the connecting rods are connected to each other by means of two prestressing elements. In order to produce a prestressing, the distance between the connecting parts of the prestressing elements provided for fixing them on the connecting rods is smaller than the distance between the connecting rods in the unstressed state.

Suitable elastic materials for the connecting rods include a carbon fiber material, steel, or aluminum, for example.

The prestressing element preferably has two essentially strip-shaped retaining parts that are kept spaced apart from each other and two collars that are supported in rotary fashion between the retaining parts and are affixed to the connecting rods; at least the strip-shaped retaining parts are composed of a rigid material, in particular a rigid plastic material, e.g. a fiber-reinforced thermoplastic.

The collars are suitably composed of two joinable collar parts, which, when joined, form a through opening for the connecting rods and have rearward-protruding bearing journals that can be inserted into corresponding bearings in the strip-shaped retaining parts.

The reversal, according to the present invention, of the elastic/non-elastic properties of the elements that cooperate to produce the prestressing has the following advantages in comparison to the prior embodiment:

Prestressing force and spring stiffness/spring constant of the entire spring system can be exactly defined through the axial position of the clamps/collars and the definite undersizing of the spacing between the connecting rods and makes it possible to calibrate each individual system.

Reduced prestressing force due to greater spring stiffness, which results in reduced wear.

Higher overall stiffness and therefore better oscillation and damping behavior.

Axial twisting of the connecting rods is prevented in the assembled position.

Tribologically optimum material pairings of the components subjected to friction render additional bearing devices obsolete, yielding inexpensive production, assembly, and maintenance.

Possibility for series production by means of injection molding.

Assurance of material durability in diverse working environments.

The connecting rods themselves, which are produced from carbon fiber material, for example, already constitute a very good spring element. Since the prestressing elements themselves are not elastic-ally embodied, the prestressing force is set by a deflection of the connecting rods. The selected spring path can be used to determine the prestressing force very precisely. The required prestressing forces and deflections in this case are only very slight in comparison to the load capacity so that the connecting rods do not lose their spring force even after a long time. In addition, the prestressing element can have damping elements mounted onto it, which in connection with the braced connecting rods, favorably affect the oscillation behavior of the robot.

Preferably, the prestressing elements are composed of two clamps or collars—which are mounted onto the rods as needed, one being affixed with degrees of freedom in all directions and one being supported in articulating fashion while simultaneously being fixed in the axial direction—and a pull/push element situated between them that is supported in articulating fashion in one degree of freedom in relation to the clamps. The prestressing system consequently fulfills all the requirements and remains mechanically under-determined.

The above-described support of the clamps or collars permits the rods to be twisted in skew fashion in relation to each other, which can further facilitate assembly. The procedure increases the absolute spatial distance between two primary or secondary ball joint sockets and can be reversed again by rotating the rods back into the parallel position. After the assembly of all parallelograms is completed, a skew twisting remains possible only in the event of an overload and results in decoupling.

If the two prestressing elements are spaced apart by a suitable distance, then one connecting rod can be decoupled manually for maintenance purposes by simply pressing the rods together in the middle. The load state of the prestressing elements therefore switches from tensile stress to compressive stress. As a result, the rods outside the prestressing elements "open" and can be removed from the joints. This can be carried out with one hand whereas the rods currently in use must be "pulled out" from the joints with two hands.

The assembly can be carried out In the same way. In this case, however, an auxiliary element that immobilizes the parallelogram angle is required since otherwise, the parallelogram simply "folds flat". This can also be achieved by immobilizing the joints by means of a corresponding device on the prestressing elements.

Another advantage of the invention is that if an overload occurs in the joints on one side of the parallelogram, then the joints on the other side also open slightly so that here, too, a facilitated decoupling occurs. As a result, with the desired load, the decoupling occurs with a greater degree of reliability.

The prestressing elements can be manufactured out of suitable friction-modified plastics; it is possible to use two different suitable plastics so that no bearing shell or lubrication is required for the joints thanks to the material pairing selected for the prestressing elements.

In the simplest case, it is also possible for one clamping element to be provided in the middle of the rods, but this eliminates the advantages of the easy disassembly. The rods must be more powerfully "deflected," which negatively affects the precision of the robot, and the connecting element must be able to absorb a torsion moment transverse to the rod axes in order to prevent a twisting of the connecting rods in this direction.

BRIEF DESCRIPTION OF THE DRAWINGS

Other advantages, defining characteristics, and details of the invention ensue from the following description of preferred exemplary embodiments and the drawings, in which.

DESCRIPTION OF THE PREFERRED EMBODIMENTS

Figure 1:
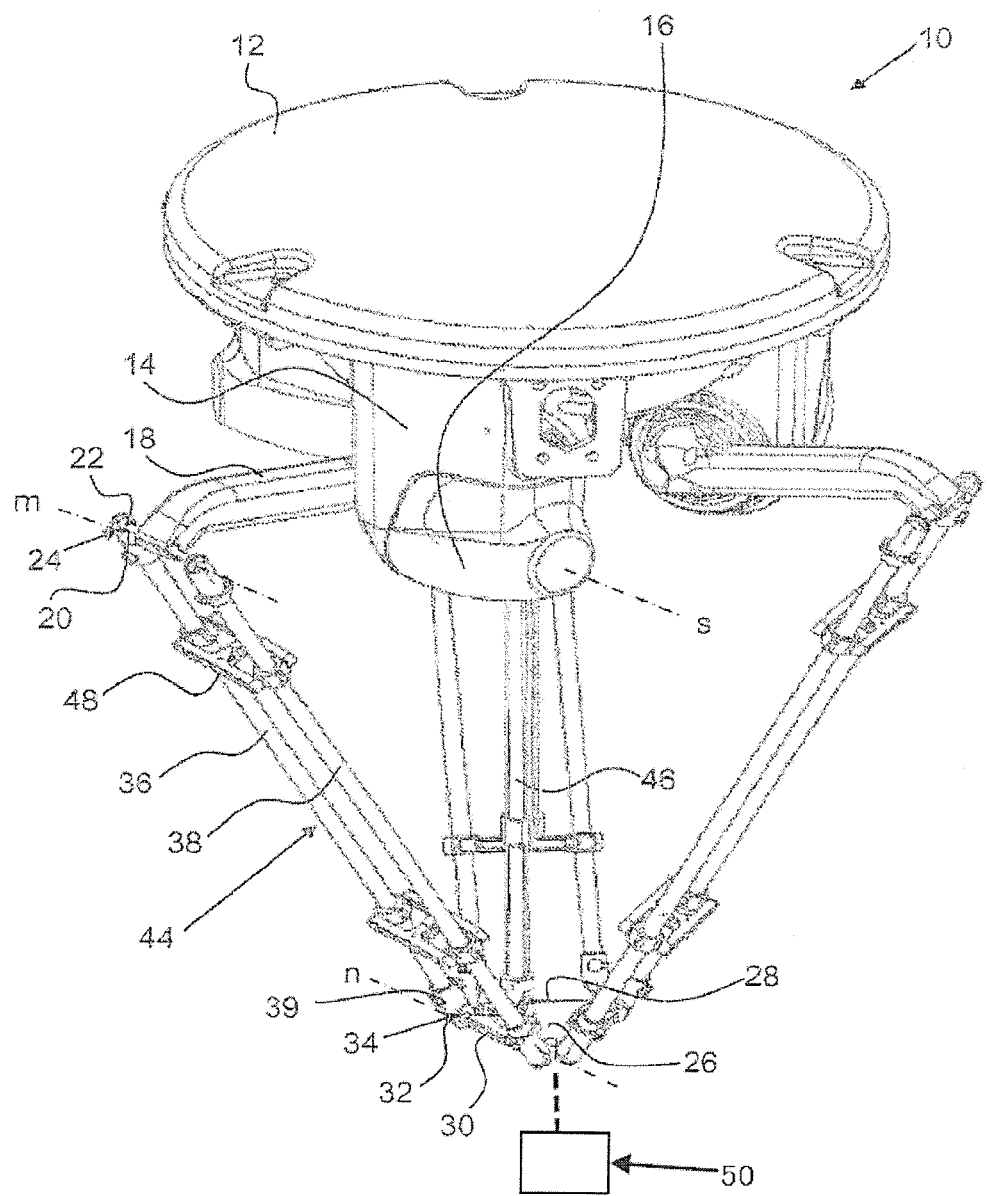
FIG. 1 is a schematic oblique view of a delta robot.

A delta robot 10 shown in FIG. 1 has a base element 12 with a horizontal mounting plane and three mounts 14 protruding from the base element 12. each for accommodating a respective motor/transmission unit 16. Each motor/transmission unit 16 has a transmission shaft that defines a transmission axis s and supports an actuating arm 18 that is able to pivot around the transmission axis s. The three transmission axes s lie in a plane parallel to the mounting plane of the base element 12 and their intersection points constitute the vertices of an equilateral triangle. At the free end of each actuating arm 18, there is a first joint rod 20 that defines a first articulation axis m oriented parallel to the transmission axis s. Each first joint rod 20 has a first joint part 22 at each of its two ends, each belonging to a first ball joint 24. The first joint parts 22 arranged in pairs are situated mirror symmetrically to each other in relation to a vertical plane; the three vertical planes intersect at a common vertical axis, which constitutes a symmetry axis for the arrangement of the three motor/transmission units 18, and enclose an angle of 120° in relation to one another.

A support element 26 essentially embodied in the form of a plate with lateral edges 28 constituting an equilateral triangle, also referred to as the tool support or platform, is equipped at each of the three lateral edges 28 with a second joint rod 30 that defines a second articulation axis n. Each second joint rod 30 has a first joint part 32 at each of its two ends, each belonging to a respective second ball joint 34. The first joint parts 32 of each second joint rod 30 are arranged in pairs and situated mirror symmetrically to each other in relation to an angle bisector of the equilateral triangle that characterizes the support element 26. Support element 26 is provided for arranging at least one gripping mechanism 50 for gripping an object.

The distance between the first joint parts 22 at the free end of each actuating arm 18 is identical to the distance between the first joint parts 32 at the lateral edges 28 of the support element 26.

Figure 2:
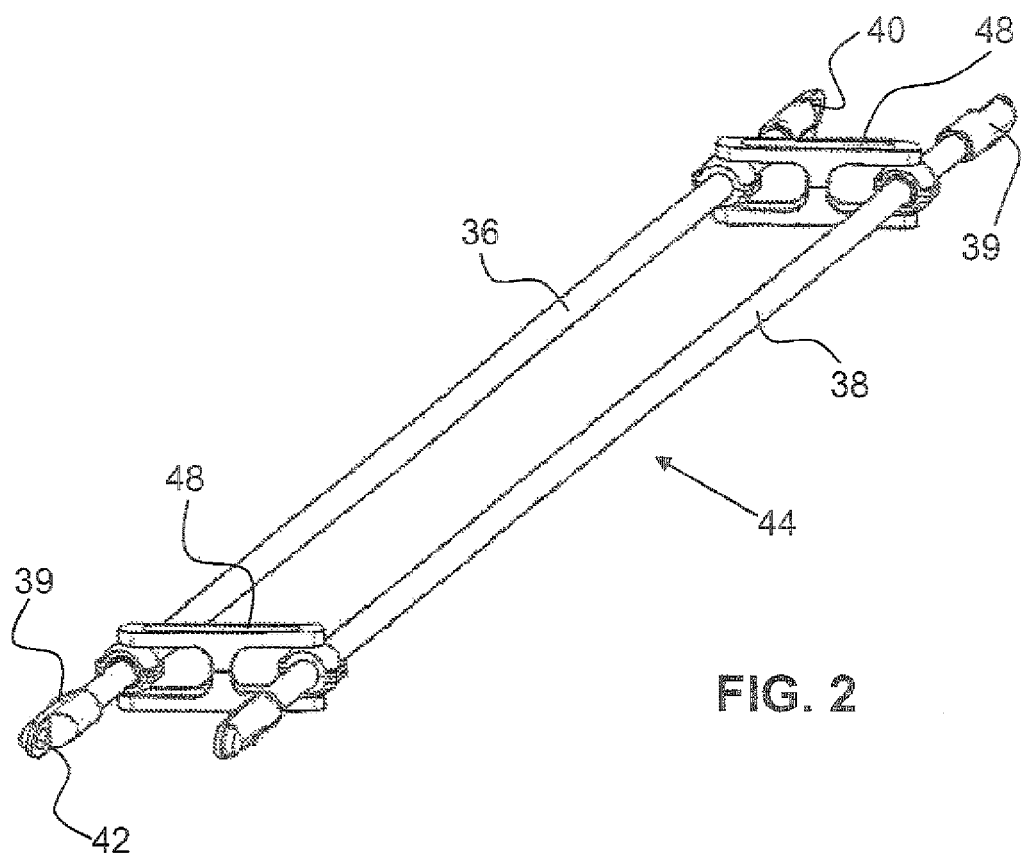
FIG. 2 is a schematic, enlarged oblique view of a parallelogram rod assembly of the delta robot from FIG. 1, equipped with two prestressing elements.
Figure 3:
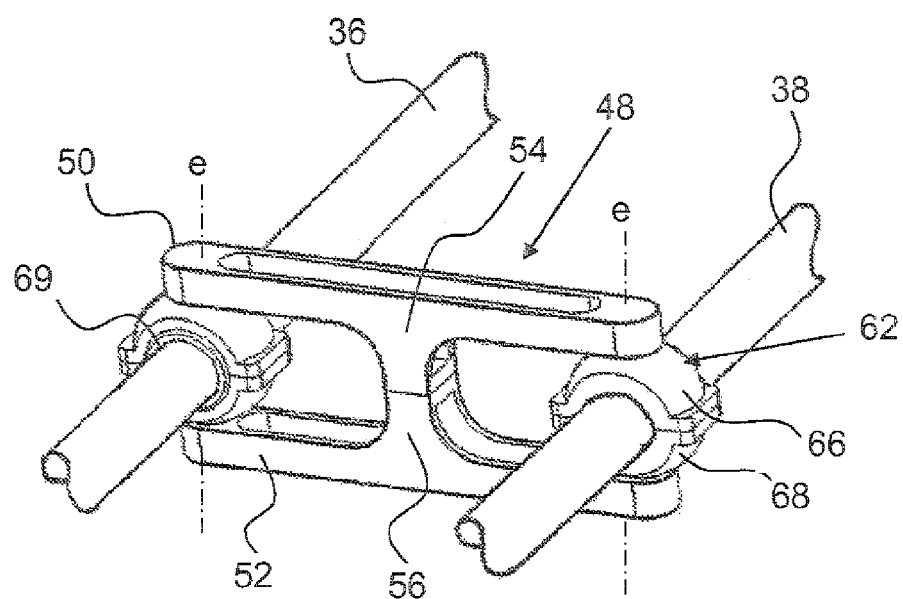
FIG. 3 is a schematic, enlarged depiction of a prestressing element of the parallelogram rod assembly from FIG. 2.

Each actuating arm 18 is associated with a respective lateral edge 28 of the support element 26. The pairs of identically embodied connecting rods 36, 38, also referred to as parallelogram rod assemblies, each have an end piece 39 at their ends, each of which is equipped with a respective second joint part 40, 42 (FIG. 2). Each second joint part 40, 42, together with a first joint part 22, 32 at the free end of the actuating arm 18 and at the lateral edge 28 of the support element 26, constitutes a corresponding first or second ball joint 24, 34.

The first joint parts 22, 32 at the free end of the actuating arm 18 and at the lateral edge 28 of the support element 26 are embodied as joint balls, the second joint parts 40, 42 on the end pieces 39 of the connecting rods 36, 38 are embodied as joint sockets.

The two equal-length connecting rods 36, 38, together with the two likewise equal-length joint rods 20, 30, constitute a parallelogram rod assembly 44, with a ball joint 24, 34 at each vertex of the parallelogram. The connection of the actuating arms 18 to the support element 26, each by means of a respective parallelogram rod arrangement 44, prevents the support element 26 from rotating around axes in all three spatial dimensions. The support element 26 is consequently only able to move parallel to itself in response to a movement of the actuating arms 18. The controlled pivoting motion of the actuating arms 18 around their transmission axes s is consequently converted into a linear motion of the support element 26.

The support element 26 is connected to the base element 12 via a telescoping, adjustable-length central shaft 46 for transmitting torques. The central shaft 46 is attached to the support element 26 by means of a universal joint. At its end oriented away from the support element 26, the central shaft 46 is connected to a drive shaft of a servomotor that is not shown in the drawing. The central shaft 46 can be used to produce a rotation of the support element 26 in three-dimensional space.

Spaced a short distance apart from the first and second ball joints 24, 34, the two connecting rods 36, 38 are connected to each other by means of a prestressing element 48 situated essentially parallel to the articulation axes m, n.

Each prestressing element 48 is composed of two essentially strip-shaped retaining parts 50, 52, each with a bridge piece 54, 56 protruding perpendicularly from the middle. The bridge pieces 54, 56 with their end surfaces resting against each other serve as spacers for the two parallel retaining parts 50, 52, which are detachably fastened to each other in the region of the bridge pieces 54, 56 by means of screws or a clip connection, for example.

Two collars 62, which are positioned symmetrical to and spaced apart from each other, are situated between the strip-shaped retaining parts 50, 52. Each collar 62 is composed of two collar parts 66, 68, which, when joined, form a through opening for the connecting rods 36, 38 and have rearward-protruding bearing journals that can be inserted into corresponding bearings of the retaining parts 50, 52. Each through opening has an axis that lies in a plane perpendicular to the rotation axes e of the bearing journals.

During assembly of the prestressing elements 48 between two connecting rods 36, 38, two collar parts 66, 68 that form a collar 62 are placed around each connecting rod and then glued to each other, screwed to each other, or fastened to each other in some other way. In this case, one of the collars 62 of the prestressing element 48 is affixed to a first connecting rod 36, e.g. by means of glue. The other collar 62 is not affixed to the second connecting rod 38, but is instead fastened to it in rotary fashion, limited in two degrees of freedom only by the connecting rod 38, but not limited in the third degree of freedom. Then the bearing journals of the two collars 62 are inserted into the corresponding bearings in the strip-shaped retaining parts 50, 52. After the two retaining parts 50, 52 are screwed or clipped together, the bearing journals of the two collars 62 remain supported between the two retaining parts 50, 52 in a fashion that allows them to freely rotate around their rotation axes e.

In the example shown, an oscillation-damping intermediate layer 69 is situated on the inside of the collars 62 affixed to the connecting rod 36, 38.

The foregoing relates to the preferred exemplary embodiments of the invention, it being understood that other variants and embodiments thereof are possible within the spirit and scope of the invention, the latter being defined by the appended claims.

The invention claimed is:

1. A device for moving and positioning an object in space, comprising:
   at least three actuating arms that are each connected to a motor/transmission unit and are pivotable around a transmission axis;
   a support element provided for arranging at least one gripping mechanism for gripping the object;
   each actuating arm having, at its free end, a first articulation axis extending parallel to the transmission axis, said first articulation axis having first joint parts which are spaced apart from each other, each belonging to a respective first ball joint;
   the support element having a second articulation axis associated with each actuating arm, said second articulation axis having first joint parts which are spaced apart from each other, each belonging to a respective second ball joint;
   the first articulation axis being connected to the second articulation axis by a pair of connecting rods that have second joint parts at their ends and, together with the first joint parts on the first articulation axis and the first joint parts on the second articulation axis, these second joint parts at the ends of the connecting rods form the first and second ball joints, and the connecting rods are connected to each other in order to stabilize the ball joints,
   wherein the connecting rods, which are composed of an elastic material, are connected to each other by at least one prestressing element composed of a rigid material,
   wherein the prestressing element has two elongated retaining parts that are kept spaced apart from each other and two collars that are supported in rotary fashion between the retaining parts and are affixed to the connecting rods.

2. The device as recited in claim 1, wherein the connecting rods are connected to each other by two prestressing elements.

3. The device as recited in claim 2, wherein in order to produce a prestressing, a distance between connecting parts of the prestressing elements provided for fixing the connecting parts on the connecting rods is smaller than the distance between the connecting rods in the unstressed state.

4. The device as recited in claim 3, wherein the prestressing elements are slidable on the connecting rods in order to set a predetermined prestressing force.

5. The device as recited in claim 3, wherein the prestressing elements are slidable on the connecting rods in order to set a predetermined spacing.

6. The device as recited in claim 1, wherein in order to produce a prestressing, a distance between connecting parts of the prestressing elements provided for fixing the connecting parts on the connecting rods is smaller than the distance between the connecting rods in the unstressed state.

7. The device as recited in claim 6, wherein the prestressing elements are slidable on the connecting rods in order to set a predetermined prestressing force.

8. The device as recited in claim 6, wherein the prestressing elements are slidable on the connecting rods in order to set a predetermined spacing.

9. The device as recited in claim 1, wherein the collars are composed of two joinable collar parts, which, when joined, form a through opening for the connecting rods and have rearward-protruding bearing journals that are insertable into corresponding bearings in the strip-shaped retaining parts.

10. The device as recited in claim 9, wherein at least the elongated retaining parts are composed of a rigid plastic material.

11. The device as recited in claim 1, wherein the collars are composed of two joinable collar parts, which, when joined, form a through opening for the connecting rods and have rearward-protruding bearing journals that are insertable into corresponding bearings in the strip-shaped retaining parts.

12. The device as recited in claim 1, wherein at least the elongated retaining parts are composed of a rigid plastic material.

13. The device as recited in claim 1, wherein the prestressing element has a damping element.

* * * * *